July 27, 1954    R. G. FOX    2,684,784
INFLATOR FOR PNEUMATIC LIFE PRESERVING APPARATUS
Filed Aug. 28, 1951
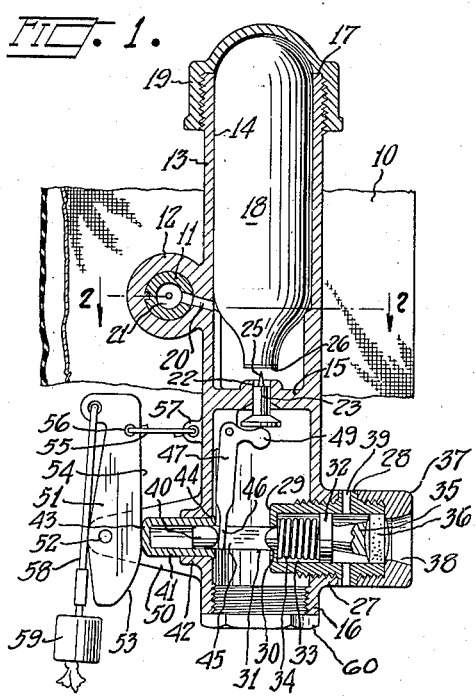
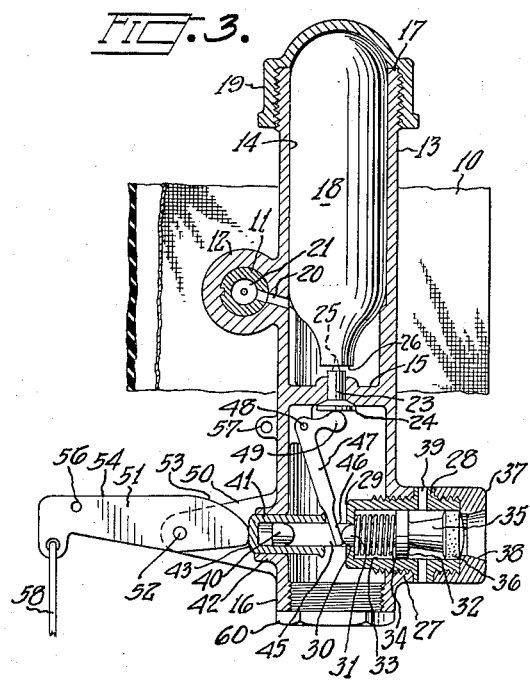
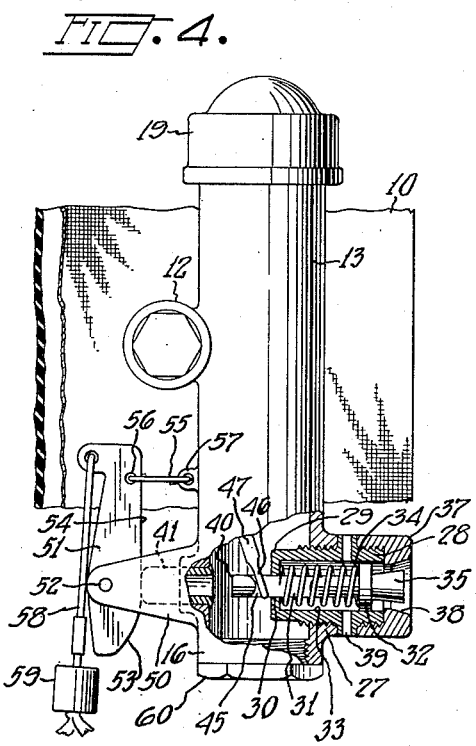
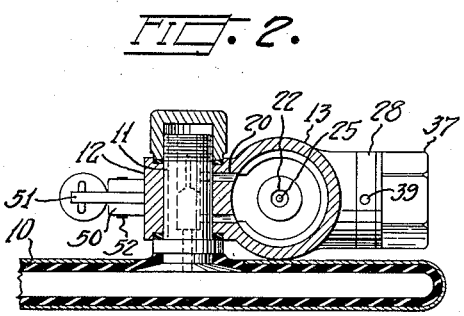
INVENTOR
ROBERT G. FOX
ATTORNEY Patented July 27, 1954

2,684,784

UNITED STATES PATENT OFFICE 2,684,784

INFLATOR FOR PNEUMATIC LIFE PRESERVING APPARATUS

Robert G. Fox, Lake Grove, Oreg.

Application August 28, 1951, Serial No. 244,068

2 Claims. (Cl. 222—5)

This invention relates generally to life preserving apparatus and particularly to an inflator therefor.

The main object of this invention is to provide a means for inflating a pneumatic life preserver, or life raft, manually at the desired time or automatically when the device comes in contact with the water.

The second object is to make an inflator of the type which will be operative at the will of the operator or to be operated automatically when the operator is unable to actuate the device.

The third object is to provide a special form of mechanism which will be easy to manufacture and which cannot be easily rendered inoperative.

I accomplish these and other objects in the manner set forth in the following specifications as illustrated by the accompanying drawings, in which Fig. 1 is a vertical section through the device showing it in a locked or storage position.

Fig. 2 is a section taken along the line 2—2 in Fig. 1.

Fig. 3 is a section similar to Fig. 1 but showing the parts in position after manual operation.

Fig. 4 is a view similar to Fig. 1 but showing the parts in position after operation was by contact with water.

Like numbers of reference refer to the same or similar parts throughout the several views.

Referring in detail to the drawing there is shown a portion of a pneumatic life belt or raft 10 around which projects a nipple 11 on which is keyed a sleeve 12 which is integral with the body 13 of the device. The body 13 has a cylindrical opening 14 at one end and a dividing partition 15 between its ends 16 and 17. In the opening 14 is placed a cartridge 18 of compressed $CO_2$ which is held in place by means of a cap 19. A passageway 20 connects the opening 14 with the interior 21 of the nipple 11.

In the partition 15 is formed an opening 22 in which is slidably mounted a pin 23 having a valve head 24 formed on the side nearest the body end 16. The pin 23 has a perforating point 25 which can be driven into the cartridge end 26 for the purpose of releasing the gaseous contents thereof, thereby permitting same to flow through the duct 20 into the member 10.

The portion of the body 13 nearest the end 16 is provided with an internally threaded side outlet 27 into which is threaded a double ended bushing 28 which end 29 is provided with an opening 30 which slidably receives the plunger 31. The plunger 31 has formed thereon a flange 32 which is slidable within the bore 33 of the bushing 28. A spring 34 is disposed on the plunger 31 between the end 29 and the flange 32 tending to urge the plunger 31 outwardly.

On the plunger 31 is a crushing head 35 which engages a tablet 36 made of flour, chalk, gelatin or any material readily soluble in water, which acts as a plug and is held in place by means of a cap 37 which is threaded onto the bushing 28. The cap 37 has an opening 38 in the end thereof. The bushing 28 has an opening 39 formed therethrough.

The plunger 31 has its end 40 projecting slidably into the tubular sleeve 41 which is slidable through the boss 42 formed on the side of the body 13. The outer end 43 of the sleeve 41 is closed and the inner end 44 of the sleeve 41 is flanged outwardly to retain the sleeve in position and also to act as a seal.

The plunger 31 is cut away along its central portion 45 to receive the forked end 46 of a bell crank lever 47 which is pivoted on the pin 48 and its short end 49 bears against the valve head 24.

On each side of the boss 42 is a standard 50 between which standards is a cam lever 51 which is mounted on a pin 52 carried by the standards 50. The lever 51 has a cam surface 53 which is tangent to the straight side 54, which straight side normally engages the end 43 of the sleeve 41 when in its outermost position, at which time the plunger end 40 is also close to the end 43.

The lever 51 is normally held in the position shown in Figs. 1 and 4 by means of a wire clip or seal 55 which can be easily opened or separated without the use of tools by merely hooking into the hole 56 in the lever 51 and into the lug 57 formed on the side of the body 13. The lug 57 is long enough to support the lever 51 as shown in Fig. 1 so that the mechanism cannot be tripped by a movement of the upper portion of the lever 51 toward the body 13. A pull cord 58 is attached to the lever 51 and has a button 59 attached to the end thereof.

The operation of the device is as follows: With the parts in the position as shown in Fig. 1 and the user is forced to take to the water, he may first release the clip 55 and, at the proper time, pull the cord 58 which actuates the lever 47 and forces the point 25 into the gas filled cartridge 18, thereby releasing the gas into the float 10. This condition is shown in Fig. 3.

If, on the other hand, he has not released the clip 55 or has failed to pull the cord 58, then the soluble wafer 36 gives way under the pressure of the spring 34, which also actuates the bell-crank lever 47, and releases the gas from the cartridge 18. This condition is shown in Fig. 4.

In the position shown in Fig. 4 in which the parts have been operated automatically by contact with water without ever releasing the safety pin 23, the parts are in the same position as shown in Fig. 3 except that the sleeve 41 and the lever 51 have not been moved.

I am aware that there are numerous forms of automatic inflating devices on the market for pneumatic life saving equipment. I do not claim such devices broadly but I do intend to cover such forms and modifications thereof as fall fairly within the appended claims.

I claim:

1. An inflator for pneumatic life preserving apparatus comprising an elongated cylindrical body having a dividing partition between the ends thereof, a pin slidably mounted in said partition having a piercing point at one end and a valve at the other end thereof, a gas filled cartridge in one end of said body adjacent to said pointed end, a bell crank lever mounted in said body having one end engaging the valve end of said pin, a plunger slidably mounted in said body drivably connected to said bell crank lever, a spring for urging said plunger in a direction to force said valve toward its seat and to force the point on said pin into said cartridge, a water soluble tablet forming a stop for holding said spring in compression and a manually operated cam lever mounted on said body for moving said plunger and actuating said bell crank lever.

2. In a device of the class described, a cartridge puncturing mechanism comprising a body having a piercing pin projecting therefrom, a bell crank lever having one end engaging said pin and having the other end of said lever forked, a plunger slidably mounted in said body having a reduced middle section engaging said fork, said plunger having a sleeve slidably mounted in said body and slidably supporting said plunger, said sleeve being closed on the outer end, a cam lever mounted on said body normally engaging said sleeve in its outermost position, a spring on said plunger for urging it to a retracted position, and a holder for a water soluble tablet whereby same may be held in the path of said plunger under the pressure of said spring, and whereby the device may be operated manually without breaking or dissolving said tablet and said tablet may be dissolved and cause the operation of the bell crank lever while said cam lever is inoperative.

References Cited in the file of this patent

UNITED STATES PATENTS

| Number | Name | Date |
| --- | --- | --- |
| 701,329 | Graham et al. | June 3, 1902 |
| 1,329,990 | Muller | Feb. 3, 1920 |
| 2,527,604 | Walk | Oct. 31, 1950 |